US005589727A

United States Patent [19]
Seward

[11] Patent Number: 5,589,727
[45] Date of Patent: *Dec. 31, 1996

[54] ENERGY STORAGE SYSTEM

[75] Inventor: D. Clint Seward, Acton, Mass.

[73] Assignee: Electron Power Systems, Acton, Mass.

[*] Notice: The portion of the term of this patent subsequent to Dec. 29, 2009, has been disclaimed.

[21] Appl. No.: 996,752

[22] Filed: Dec. 24, 1992

Related U.S. Application Data

[63] Continuation-in-part of Ser. No. 841,308, Feb. 24, 1992, Pat. No. 5,175,466, which is a continuation of Ser. No. 529,783, May 25, 1990, abandoned, which is a continuation of Ser. No. 214,904, Jun. 28, 1988, abandoned, which is a continuation of Ser. No. 914,629, Oct. 2, 1986, abandoned.

[51] Int. Cl.$^6$ .................................................. H05H 1/46
[52] U.S. Cl. ........................................................ 313/231.31
[58] Field of Search ...................... 313/231.31; 328/233; 376/127, 128, 129, 133, 137, 139

[56] References Cited

U.S. PATENT DOCUMENTS

| | | | |
|---|---|---|---|
| 2,233,779 | 3/1941 | Fritz | 250/36 |
| 2,993,851 | 7/1961 | Thomson et al. | 204/193.2 |
| 3,029,199 | 4/1962 | Baker et al. | 204/193.2 |
| 3,141,826 | 7/1964 | Friedrichs et al. | 176/7 |
| 3,155,594 | 11/1964 | Lehnert et al. | 176/8 |
| 3,255,404 | 6/1966 | Kidwell | 323/44 |
| 3,626,305 | 12/1971 | Furth et al. | 328/233 |
| 4,555,666 | 11/1985 | Martin | 328/233 |
| 5,175,466 | 12/1992 | Seward | 313/231.31 |

OTHER PUBLICATIONS

Malmberg, J. H., et al., "Pure Electron Plasma, Liquid, and Crystal," *Physical Review Letters*, 39(21):1333–1336, (21 Nov. 1977).

Gilbert, S. L., et al., "Shell–Structure Phase of Magnetically Confined Strongly Coupled Plasmas," *Physical Review Letters*, 60(20):2022–2025, (16 May 1988).

Hangst, J. S., et al., "Anomalous Schottky Signals from a Laser–Cooled Ion Beam," *Physical Review Letters*, 74(1):86–89, (2 Jan. 1995).

Radin et al., "Physics for Scientists and Engineers" Publication of Lehigh University, pp. 559–560 ©1982.

*Primary Examiner*—Sandra L. O'Shea
*Attorney, Agent, or Firm*—Hamilton, Brook, Smith & Reynolds, P.C.

[57] ABSTRACT

An energy storage device in which a vacuum tube and a magnetic field are used to store electrons circulating within the tube along spiral paths. The vacuum tube can have a generally toroidal shape and contains an electron gun or filament to inject electrons into the tube. Systems for retrieving electrons and precisely controlling their movement within the tube use a microprocessor control circuit that may be programmed to perform energy storage and retrieval functions.

19 Claims, 11 Drawing Sheets

ARROWS INDICATE DIRECTION OF PARTICLE FLOW 5,589,727

ENERGY STORAGE SYSTEM

RELATED U.S. APPLICATION

This is a continuation-in-part application of U.S. Ser. No. 07/841,308 filed on Feb. 24, 1992, issuing Dec. 29, 1992 as U.S. Pat. No. 5,175,466, which is a continuation application of U.S. Ser. No. 07/529,783 filed on May 25, 1990 which was a continuation application of U.S. Ser. No. 07/214,904 filed on Jun. 28, 1988, which was a continuation application of U.S. Ser. No. 06/914,629 filed on Oct. 2, 1986, the contents of which are incorporated herein by reference.

BACKGROUND OF THE INVENTION

This invention relates to single charge plasmas of fixed geometry and the generation of said single charge plasmas. For the purposes of this invention, a plasma is defined as a collection of charged particles of like charge, that is, the plasma or plurality of charged particles can be either all negatively, or all positively charged.

At the present time, traditional fixed geometry plasmas are difficult to contain and utilize. One notable use of plasmas utilizing particles of opposite charge is in fusion reactors wherein the plasma is raised to high energy levels and contained within strong magnetic fields. The plasma is amorphous in shape in that it is contained as a ring shaped mass held in place by magnetic fields and includes particles of unlike charge having pathways or orbits within the ring that are not precisely fixed or defined.

A second notable use of a traditional plasma is in particle accelerators such as cyclotrons where charged particles are raised to high energy levels and contained by complex magnets. The shape of the mass of charged particles is essentially amorphous. A third use of charged particles is for electron beams. These beams are useful for welding and deposition, but are transient in nature and of a simple, line geometry.

SUMMARY OF THE INVENTION

A plasma geometry that is fixed rather than amorphous is provided by the present invention in which the particles move in definable paths. When so configured, the plasma will be containable and controllable to a far greater degree than an amorphous plasma. Energy can be added to or removed from the plasma in a well defined, simple, and controlled manner opening new possibilities for energy storage.

The system provides a generator for the fixed geometry plasma having a specific toroidal shape. The system shapes the plasma into a toroid using a circular magnetic field generated by a charged particle beam, a single conductor, or a toroidal conductor coil, or other method.

A plasma is shaped into a fixed and stable geometric form in which the orbit of the charged particles is definable and predictable. The geometry of the plasma will be a toroid, an elongated toroid, or any number of desirable shapes.

A fixed geometry plasma generator can include a vacuum, charged particle source, and a circular magnetic field. In one embodiment of the fixed geometry plasma generator a single conductor is used to generate a circular magnetic field. In another embodiment a charged particle beam is used to generate a circular magnetic field. In another embodiment a toroid conductor coil is used to generate a circular magnetic field. Described is a simple way to modify the toroid coil to generate an infinite family of fixed geometry plasmas.

A further embodiment of the invention relates to a vacuum tube system for energy storage. An electron source assembly can be sealed onto a port of the vacuum tube to provide controlled injection of electrons. Charged plates can be positioned about the vacuum system to add additional energy.

The novel features of this invention are set forth in detail in the appended claims. The invention will best be understood when read in with conjunction with the accompanying drawings and descriptions.

DESCRIPTION OF THE PREFERRED EMBODIMENT

A single charge plasma is defined as a collection of charged particles of the same charge. Examples of charged particles are electrons and ions.

A toroid is defined as a surface generated by the rotation of a plane closed curve about an axis in the plane. A typical toroid has a donut shape in a three dimensional configuration.

Figure 1:
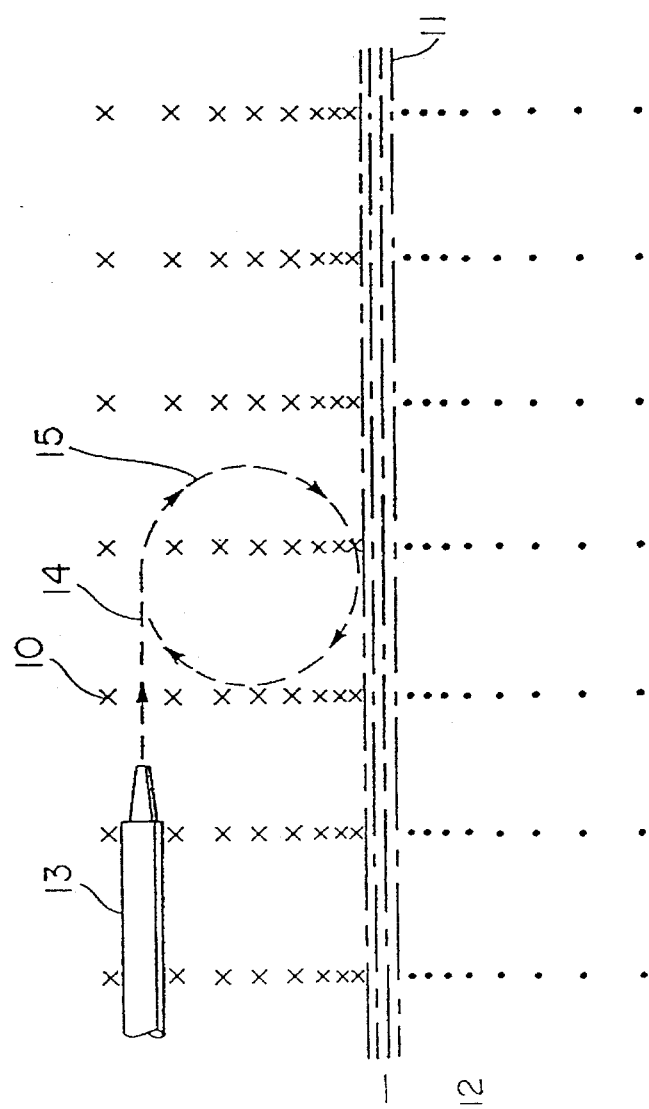
FIG. 1 illustrates a view transversal to the initiating conductor.

The elements required to initiate an electron plasma toroid are an electron beam, a circular magnetic field, and a vacuum are described with reference to FIG. 1. Circular magnetic field lines 10 are shown. Using conventional notation, an "x" indicates field line in the direction into the page, where a "." indicates a line out of the page. A method of generating the circular magnetic field is shown using an electrical conductor 11 carrying an electrical current 12 in the direction shown. It is noted that the conductor could be a single conductor, a series of conductors, or a charged particle beam as long as an electrical current is present which creates a sufficiently strong circular magnetic field. The chamber into which the charged particles are injected is evacuated.

Figure 2:
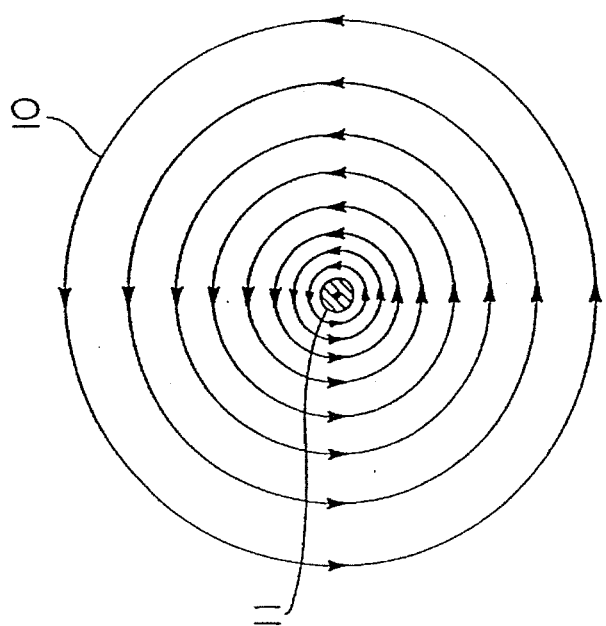
FIG. 2 is a cross sectional view of the circular magnetic field taken perpendicular to the conductor.

An electron beam source 13 is used to initiate an electron beam 14. The electron beam will curve as shown due to the presence of the magnetic field in accordance with F=BVq, a basic law of physics where F is force, B is magnetic field strength, V is particle velocity, and q is particle charge. The electron beam can be replaced with a charged particle beam, either positively or negatively charged, although care must be taken to allow for proper rotation in the circular magnetic field in accordance with the laws of physics. The shape of the orbit is defined by the balance of forces F=BVq and F=ma where m is the mass of the particle and a the acceleration. If the circular magnetic field and rotational force of the charged particle are in balance, similar to a cyclotron, the beam will form a circular orbit 15 as shown. The circular magnetic field is shown in a view perpendicular to the conductor in FIG. 2.

Figure 3:
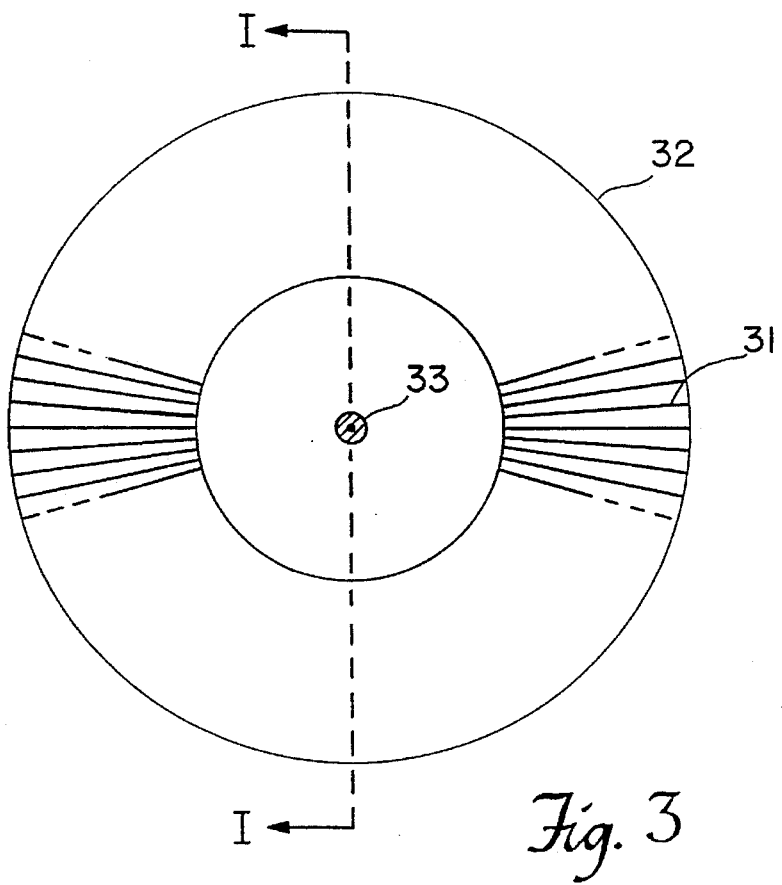
FIG. 3 provides a top view of the toroidal plasma.

As the electrons rotate in the magnetic field multiple orbits will form. The multiple orbits will spread out into a spiral since like charges repel. The electron beam can be slightly at an angle to the axis of the conductor to facilitate the spreading and spiraling of the electrons. Referring to FIG. 3; as the electrons spread out, they remain in the orbits 31 due to the force of the circular magnetic field, but spread as shown into a toroid 32. This results in an electron plasma toroid. The orbits are connected as one large spiral and the number of orbits can vary. If the electrons are replaced with charged particles, the result is a charged particle plasma toroid.

Figure 4:
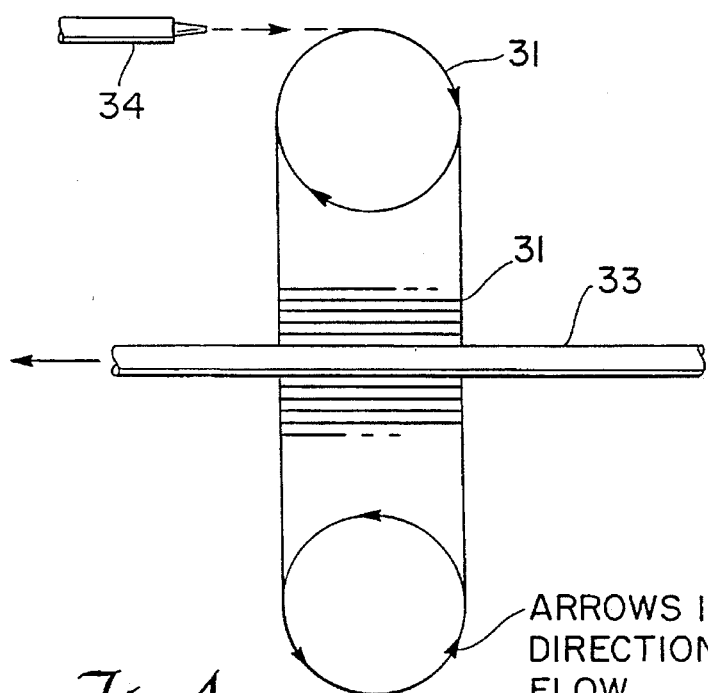
FIG. 4 provides a cross sectional view of the toroidal plasma.

In FIG. 4, note the conductor 33 and the electron beam generator 34. The details of the circular magnetic field are omitted in FIGS. 3 and 4. to allow a clearer picture of the toroid, but would be similar to those shown in FIGS. 1 and 2.

Note that the orbit of the electrons is generally circular, but may vary somewhat from circular as a function of the change in strength of the magnetic field as the distance from the conductor increases. In a typical configuration the electron velocity is approximately $5 \times 10^7$ Meters/Second. The velocity can vary from higher to lower values as long as the balance of forces is maintained. The velocity of all the electrons is substantially uniform. The circular magnetic field in a preferred embodiment is generated by an approximately 1000 amp-turn coil. The current may vary from higher to lower values as a function of force required to retain the electrons in orbit. The circular magnetic field can be generated in many ways. The conductor approach is perhaps the simplest in concept. The conductor can be replaced with a charged particle beam. A particle beam and a plasma are best generated and maintained in a vacuum where the absence of atmosphere will prevent collisions between gas molecules and particles. The collisions with air or gas molecules will shorten the life of the plasma. Vacuum levels required to establish a particle beam are well known. As a rule the better the vacuum the fewer collisions and the longer the life of the plasma. The vacuum level in the present embodiment is about $5 \times 10^{-8}$ mbar. Lower vacuum levels are preferred as collisions will be minimized thereby increasing mean beam length and reducing the energy needed to maintain the beam. A vacuum in the range of $10^{-6}$–$10^{-8}$ mbar is preferred.

When the electron plasma toroid has been initiated, the original circular magnetic field can be removed and the electron plasma toroid will substantially retain its configuration if a sufficient number of electrons are in the plasma.

Initiation

The initiation of the electron spiral toroid requires a balance of forces be maintained between the spiral of electrons and the circular magnetic field. The formulas for this are the same as for a cyclotron.

The force of rotation of an individual electron is $$F(R) = \frac{MV^2}{r_o}$$

Where M is the electron mass of $9.11 \times 10^{-31}$ KG

V is the electron velocity.

$r_o$ is the radius of the electron orbit.

(From "Physics for Students of Science and Engineering", Halliday and Resnick; John Wiley & Sons, Inc. p. 702)

The force countering F(R) is F(L), the force initiated by the magnetic field created by the initiation coils.

$$F(L) = qVB$$

Where q is the electron charge, V is the electron velocity, and B is the magnetic field of the coil.

Since the initiating coil is a toroid, the magnetic field is derived using Ampere's Law:

$$\frac{1}{\mu_o} \oint B \cdot dL = i$$

This gives B for a toroid as:

$$B = \frac{\mu_o i N}{2\pi r_t}$$

where $\mu_o$ is the permeability constant of $1.26 \times 10^{-6}$ Henry/Meter; i is the current in the coil windings, N is the number of coils; $r_t$ is the toroid radius.

Establishing a balance of forces between F(R) and F(C) is a simple matter of controlling the velocity of the electrons and balancing that with the product of the coil current and number of turns.

In this configuration the electrons spiral completely around the circular magnetic field.

Self Contained Toroid

An electron spiral toroid will remain self contained after initiation. This occurs when sufficient number of electrons is present and when the electrons are at an appropriate velocity to achieve a self-containing balance of forces. This self-containing balance of forces occurs when the total charge trying to push the electrons outward matches the magnetic field created by the circulating electrons which tries to squeeze the electrons together.

The total charge of electrons creates a space charge. Since all electrons have the same charge, they will all repel each other.

Coulomb's Law states that the force of diffusion for two electrons is:

$$F = \frac{1}{4\pi\epsilon_o} \frac{q_1 q_2}{r}$$

where q is the electron charge, r is the distance between them, and $\epsilon_o$ is the permittivity constant.

Gauss's Law can be applied to show that for a spherical Gaussian surface of radius r, the electric field has the value it would have if the charge were concentrated at its center. Similarly, for the electron plasma toroid taking into account that its surface is a toroid, $$F(C) = \frac{nqq}{16\pi\epsilon_o} r_p^2$$

where n is the total number of electrons and $r_p$ is the distance from the toroid center to the farthest electrons. Due to the construction of the toroid, this is the worst case force for repulsion on an electron.

Figure 18:
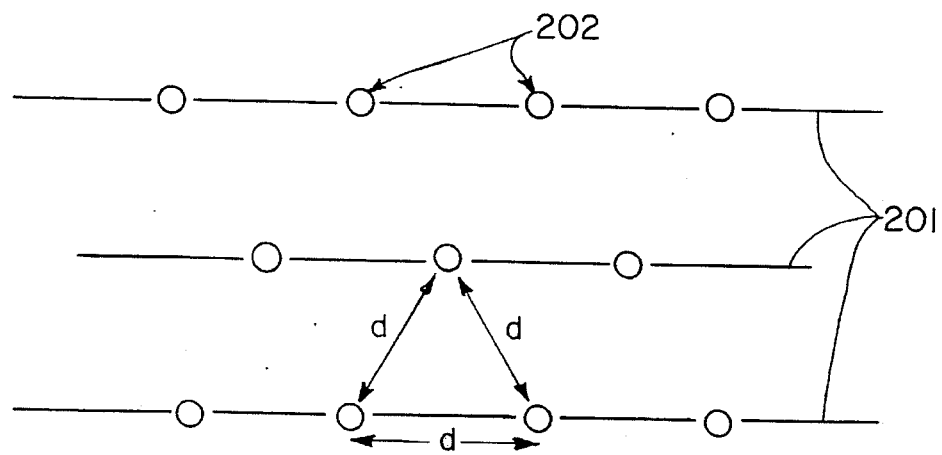
FIG. 18 shows at a microscopic scale three adjacent electron orbits.

Note that F(c) will force the electrons outward from the center of the toroid. This forces the electrons to reside on the surface of the toroid as a sheet of charge. Note also that when the electrons reside on the surface they will be subject to local electrostatic forces between electrons which will cause the electrons to be approximately equidistantly located from each adjacent electron. As the size of each electron is small relative to the electron orbit radius, the electrostatic repulsion forces from electron to electron can be considered. FIG. 18 shows portions of three orbits 201, with electrons 202 spaced equidistantly by distance d.

Countering the space charge repulsion are the magnetic fields created by the circulating charge of the electrons. These are considered on a microscopic basis, that is, on an orbit to orbit basis.

With the electron plasma toroid, the electrons in orbit are a current and create a magnetic field. From Ampere's Laws:

$$\frac{1}{\mu_o} \oint B \cdot dl = i$$

Figure 19:
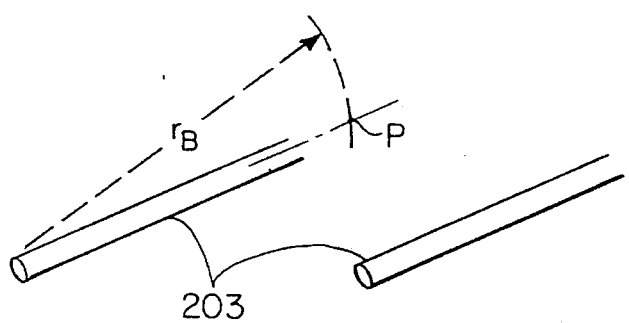
FIG. 19 illustrates the example of an electron which has a perturbed orbit P at a distance $r_t$ from any given orbit 203.

The toroid has great symmetry making the individual electron orbits behave as straight wires for the purpose of analysis. Thus, Ampere's Law reduces to:

$$\frac{1}{\mu_o} (B)(2\pi r_B) = i$$

or $$B = \frac{\mu_o i}{2\pi r_B}$$

where i is the current in an orbit, and $r_B$ is the distance from one orbit to the point of interest. Shown in FIG. 19 are two orbits 203 coming out of the page. The magnetic field of the left orbit is shown at distance $r_B$.

Assume an electron is perturbed from orbit to point P in FIG. 19, the restoring force is $$F = qVB.$$

Figure 20:
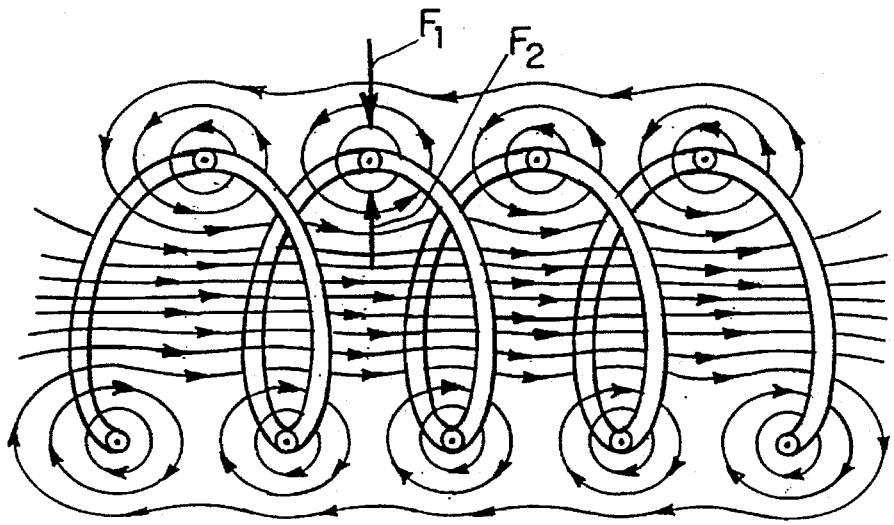
FIG. 20 illustrates forces acting upon an electron by the surrounding magnetic field which operates to contain the electron in the orbit.
Figure 21:
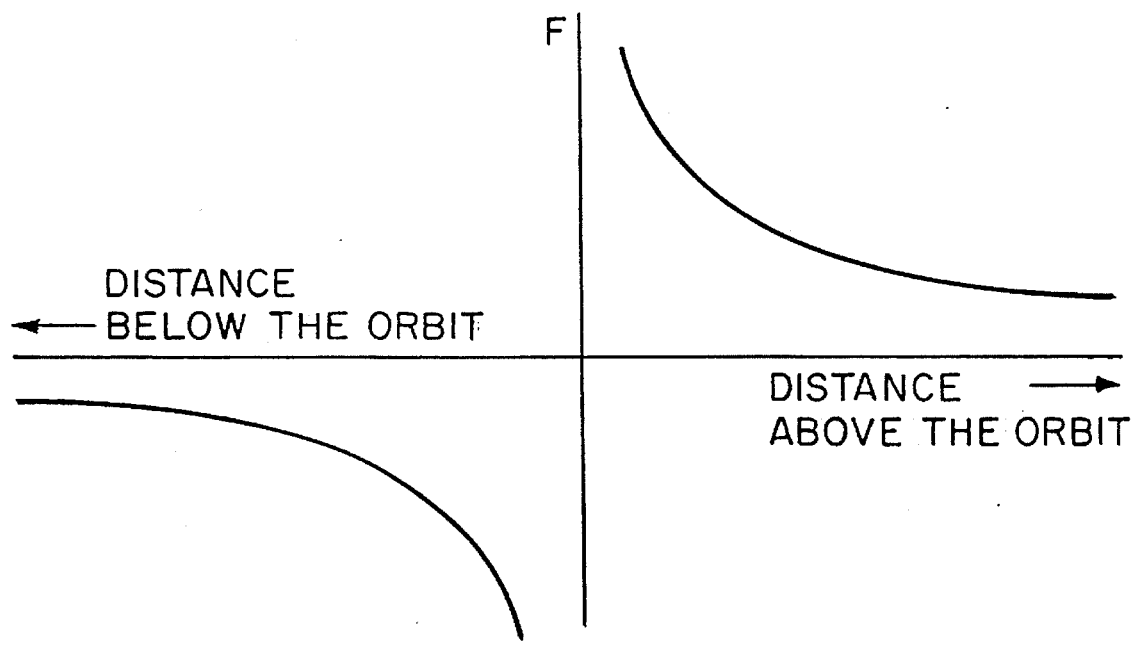
FIG. 21 graphically illustrates the forces acting on an electron when perturbed from its orbit.

The total field of the interacting orbits is shown in FIG. 20.

The total force on the perturbed electron is the sum of the forces of all the orbits. This is derived to be:

$$F = \frac{\mu_o}{2\pi} \frac{q^2 V^2}{d^2} \left( 2 \sum_{n=1}^{n} \frac{1}{\sqrt{n}} \right)$$

For n=½ the number of orbits and assuming point P is precisely distanced above the orbit. What this says is that each orbit contributes to the restoring force, with closer orbits contributing more and distant orbits contributing less. A force $F_1$ above the orbit will act downward, while a force $F_2$ below the orbit will act upward as shown in FIG. 20.

A quantitative example:

Initiation $$F(R) = \frac{MV^2}{r_o}$$

$$= 1.33 \times 10^{-13} \text{ Newton}$$

with

V=9.37×10⁷ M/S
$r_o$=0.06

$$F(L) = qVB = \frac{qV\mu_o iN}{2\pi r_i}$$

$$= 1.33 \times 10^{-13} \text{ NEWTON}$$

with $r_i$=0.42M; i=5.3 Ampere; N=2500.

Self Containing $$F(C) = \frac{nq^2}{16\pi\epsilon_o r_p^2} = 1.56 \times 10^{-9} \text{ Newton}$$

with n=6.25×10¹⁸ electrons.

F(M)=6.15×10⁻⁹ Newton, the magnetic restoring force.
F(M) is well in excess of the force needed to overcome the space charge.

Note that the forces for self containing are so large relative to the initiating forces that the latter can be ignored.

Figure 7:
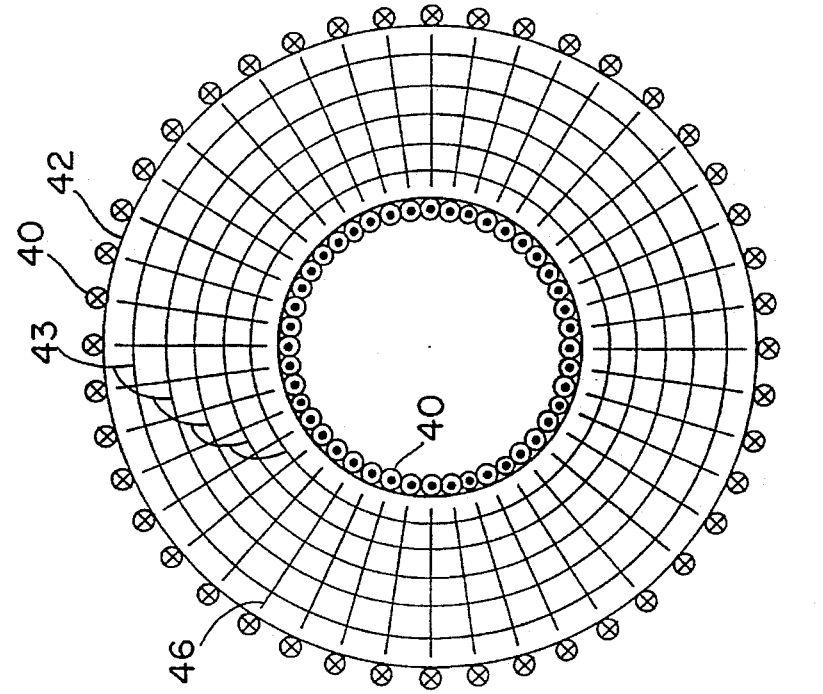
FIG. 7 is a cutaway top view of the toroidal conductor coil with details of the internal toroid plasma.
Figure 6:
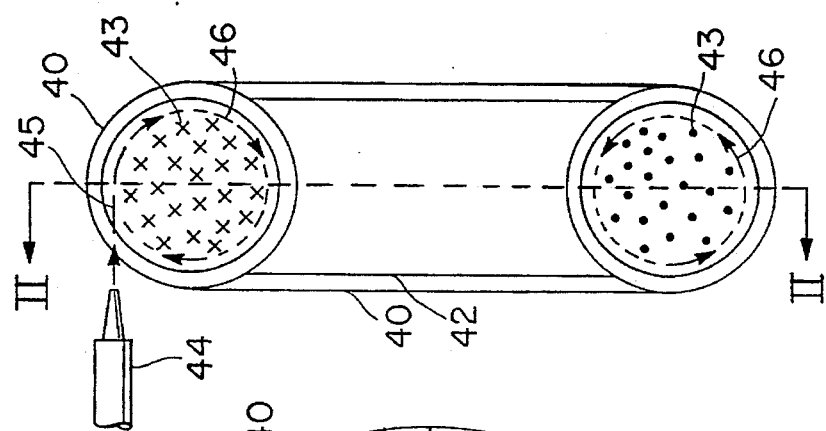
FIG. 6 is a cross sectional view of the toroidal conductor coil with a toroid plasma internal.
Figure 5:
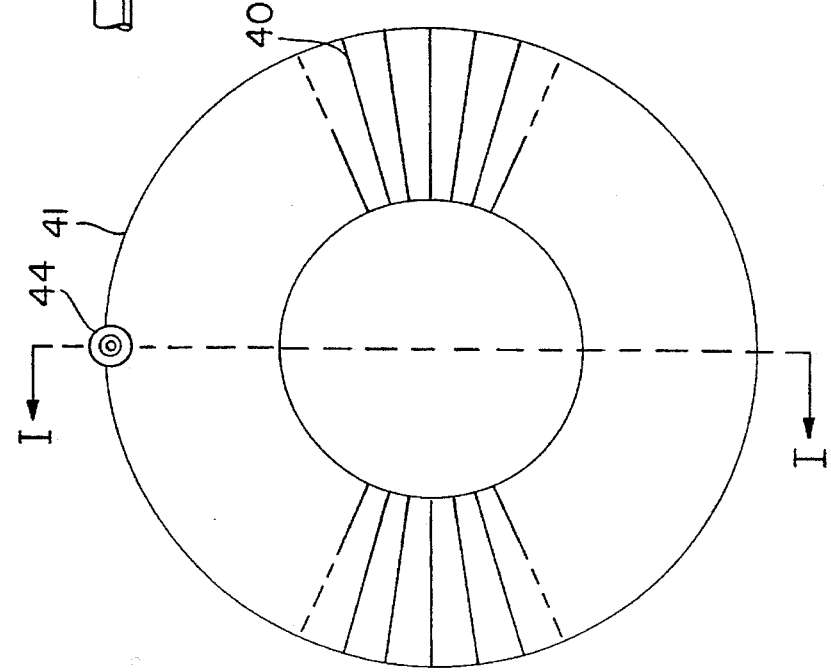
FIG. 5 is a top view of the toroidal conductor coil.
Figure 8:
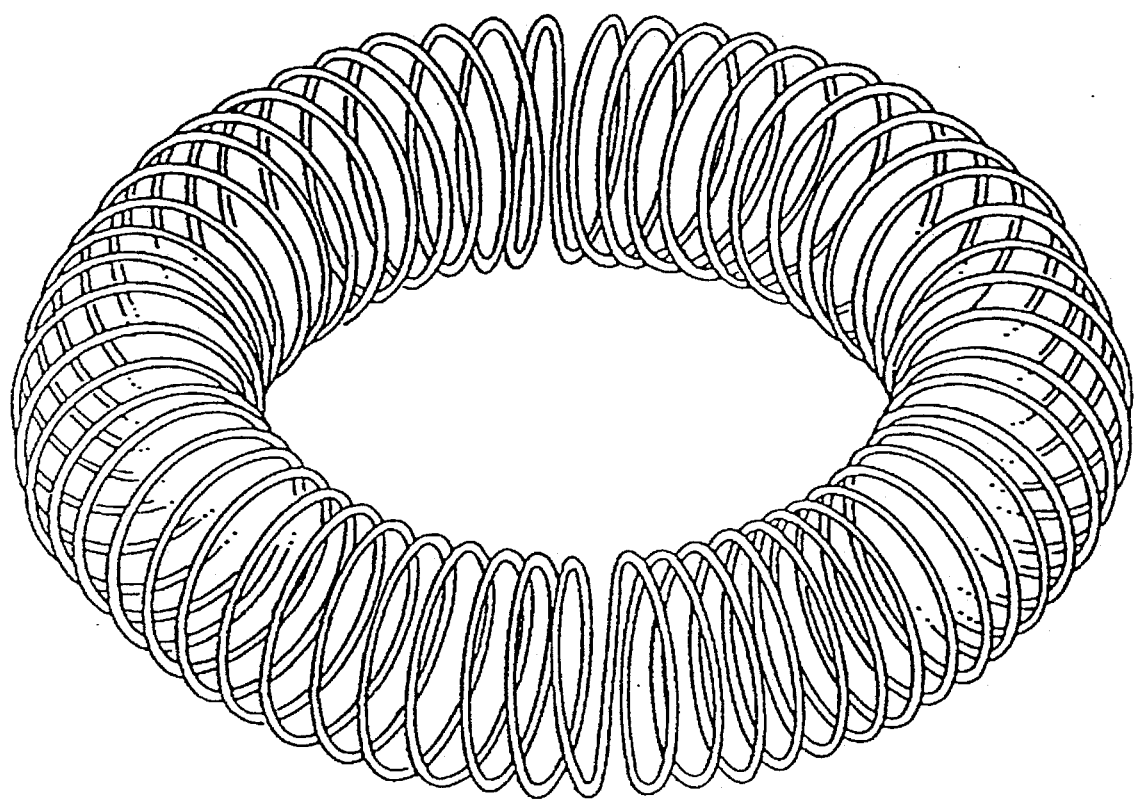
FIG. 8 is a perspective view of the Toroidal geometry of the plasma having a spiral structure.

FIGS. 5, 6, and 7 shows an alternate method for initiating a single charged plasma particle toroid. The required circular magnetic field is initiated by utilizing a conductor toroid consisting of an electrical conductor 40 wound in the shape of a toroid 41 around a casing. The casing would be made of a suitable material such as glass which can withstand a vacuum. The casing 42 is shown in FIGS. 6, and 7. The circular magnetic field 43, shown schematically in FIGS. 6, and 7, will be created when a current is sent through the electrical conductor.

The number of windings required is a function of the circular magnetic field strength required and the strength of the electrical current which flows through the electrical conductor. The number of windings required is a function of the circular magnetic field strength required and the strength of the electrical current which flows through the electrical conductor. With 1000 turns in the conductor toroid, the circular magnetic field created by 3 to 6 amperes would be comparable to the circular magnetic field generated by a 3000 to 6000 ampere current in a single conductor.

The number of windings is shown schematically in FIGS. 5 and 7 and will vary depending on current per conductor and magnetic field required. An electron beam source 44 is used to initiate an electron beam 45. The beam spreads out into an electron plasma toroid inside the conductor toroid. A typical orbit 46 spreads into a spiral as described previously in connection with FIG. 3.

Note further that the coil can be elongated into an oval form and still maintain a plasma of a fixed geometry, although not toroidal. The coil can be altered in an infinite number of slight variations but still maintain a plasma of fixed geometry (slightly varied from toroidal).

Figure 9:
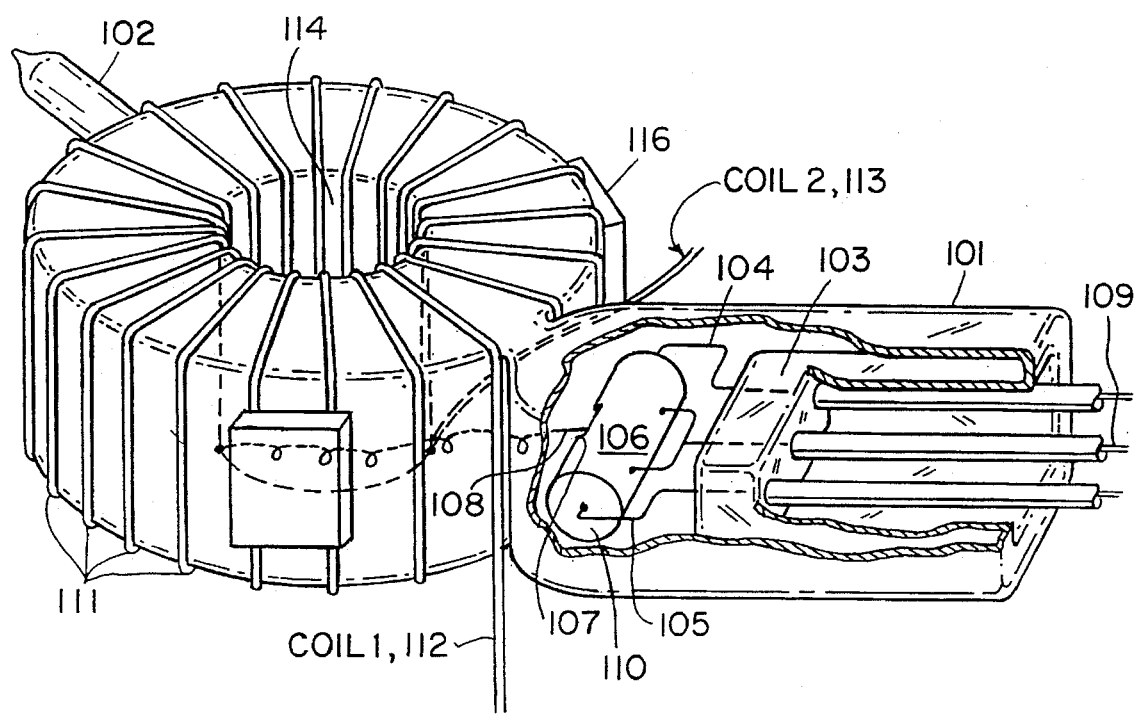
FIG. 9 is a partially cutaway perspective view of a toroid plasma tube.

FIG. 9 shows a perspective view of a toroid plasma tube. The tube has a glass enclosure 101. The glass enclosure is a vacuum tube material suitable to hold a vacuum in the range $10^{-4}$–$10^{-8}$ mbar. The tube in this embodiment has a diameter of about four inches. The orbital cavity is 1.5 inches high along the outer and inner walls. The dimensions of the tube will depend upon the particular application. A vacuum port 102 is used to evacuate the tube to remove all gases, as is typical for a vacuum tube. After evacuation of the tube, the port is sealed to retain the vacuum. Alternately, a standard vacuum flange may be fitted to the vacuum port to allow evacuation. A glass base 103 is provided to position the electron source assembly and to pass wires from outside the tube into the vacuum. As in many vacuum tubes, a filament is provided and is heated to facilitate electron flow. Power is supplied to the filament through a wire 104 to a resistance wire (see FIG. 10) and to ground return through wire 105. This provides heat which creates free electrons at the cathode (see FIG. 10). This is a well known technique and can be done in many ways.

The electrons are accelerated by the anode 106. The anode is tubular, with a slit 107 through which electrons emerge to form a beam 108. The anode provides acceleration voltage through an external circuit connected by wire 109. The anode will readily form a beam at 50 VDC to 300 VDC, and above, with more voltage providing more acceleration and therefore faster moving electrons. The anode is insulated from the cathode by insulators 110.

A coil 111 is provided to produce a magnetic field. Coil windings are shown, schematically, as many more are needed than shown. The coil will produce a field which is a circular magnetic field and circles through the portion of the tube covered by the coil. All coils are wound in the same direction and connected together in one large spiral, or solenoid. The two ends of the coil are brought out as a first coil 112 and a second coil 113 to be connected to an external power supply for power. For this version of the toroid plasma tube, a current in the range of 3 amp to 25 amp will cause the beam to spiral in varying orbit diameters. The coil is wound on the outside of the tube, as a convenient method of fabrication, but could reside within the tube as long as the beam has room to spiral. An essential feature of the toroid plasma tube is the center hole 114 which allows the coil to be wound into a toroid. This feature allows the generation of a circular magnetic field. Due to the construction of the tube, the coil is not totally symmetrical, so small auxiliary magnets 115, 116 are placed as required to shape the orbit of the beam path.

Figure 10:
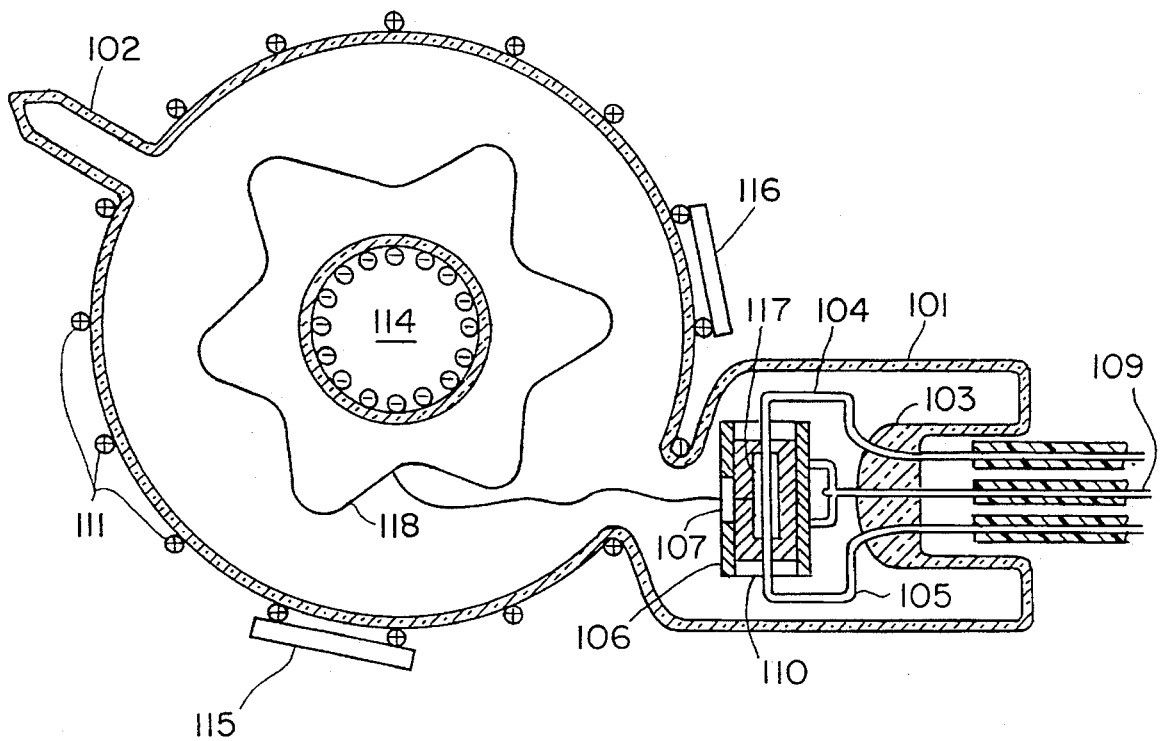
FIG. 10 is a cutaway top view of a toroid plasma tube.

FIG. 10 shows a cutaway top view of the toroid plasma tube. One additional detail not shown in FIG. 9 is the cathode wire 117 which resides inside the anode assembly. Over the wire is coated a cathode material, In the cutaway view it is shown as being insulated from the anode by insulators 110. The electron beam spiral is shown in its complete path 118. Coil wires 111 are shown, in a representative number, but not in total numbers as they are too numerous to show. Similarly, the electron beam spiral is shown schematically as many more orbits occur than can be shown. Current direction is shown using standard conventions.

Figure 11:
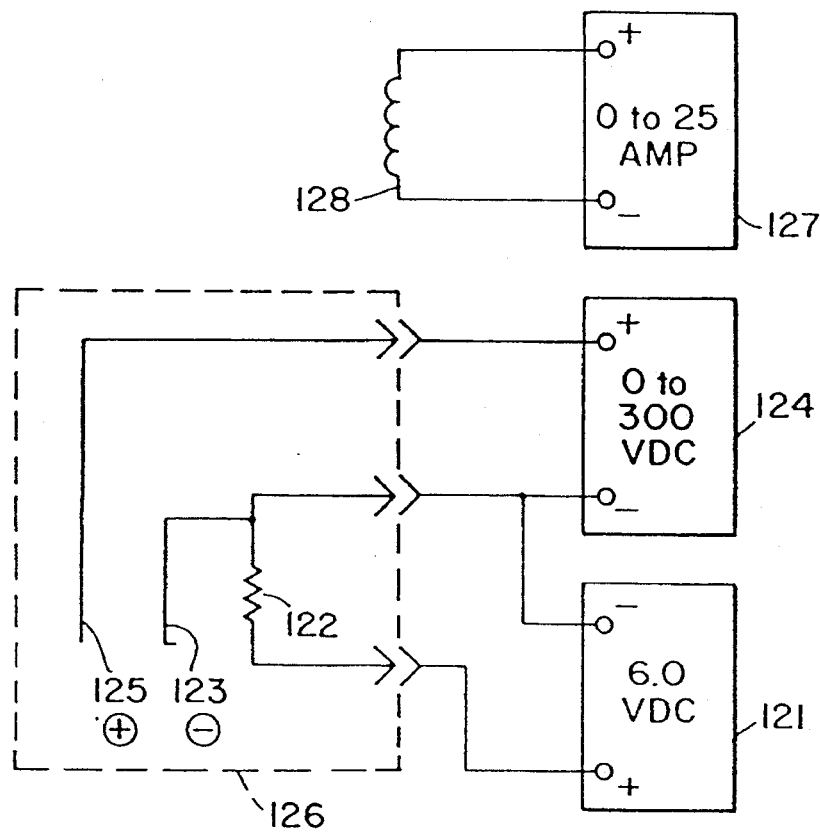
FIG. 11 is a schematic circuit diagram of the toroid plasma tube system.

FIG. 11 is a schematic which shows the electrical connections of the toroid plasma tube. A filament supply 121 heats the filament 122. The cathode 123 produces electrons. The anode supply 124 provides an electron accelerating voltage to the anode 125 which accelerates the electrons into a beam. The cathode, anode, and filament reside within the vacuum tube 126. The coil power supply 127 provides power to the toroid coil 128. The toroid coil produces the circular magnetic fields.

Figure 12:
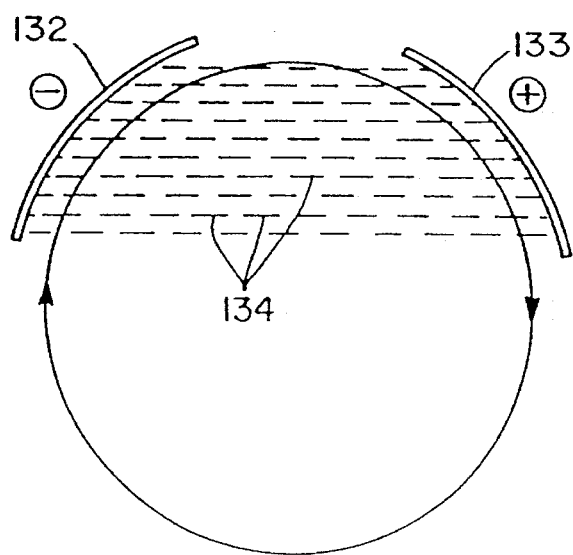
FIG. 12 is a schematic representation of a toroid employing accelerator plates.

FIG. 12 is a schematic representation of the acceleration plates. These employ known techniques used in vacuum tubes and are easily integrated into all of the embodiments described herein. The electrons accelerated to add energy to the spiral. In FIG. 12, an orbit of the entire torroidal spiral is shown with the indicated direction of rotation. Plate 132 is negative charged and a second plate 133 is positively charged. The two plates 132, 133 set up electric field lines 134. As an electron in orbit passes through the field lines 134 it will be accelerated in the orbital direction. In this way energy can be added to the electrons following the indicated orbit.

The amount of energy stored in the toroid is calculated using standard laws of physics. Each electron stores energy. In the toroid all electrons have substantially the same velocity and substantially the same energy. Total energy stored is therefore the product of the total number of electrons and the energy per electron.

Initial prototypes used low energy electrons at 50 to 150 electron volts. Electrons can be accelerated to approximately 25,000 electron volts, without significant synchrotron radiation losses, and much higher where losses can be tolerated. Total number of electrons stored can be great since increasing electron quantity will increase the magnetic restoring force and maintain the balance of forces. Initial prototypes had small total charge. Charge total greater than ten coulombs has been observed. More than that appears possible.

Energy removal is done in several ways. The first method utilizes energy removal by collisions. The toroid stores energy. When particles approach the toroid, they are repelled electrostaticly, absorbing energy in the process. By valving open the vacuum chamber and allowing increases in the number of particles, energy will be removed from the toroid by the collisions. The heated particles can be removed from the vacuum chamber in a controlled manner for use of the heat energy elsewhere.

Figure 13:
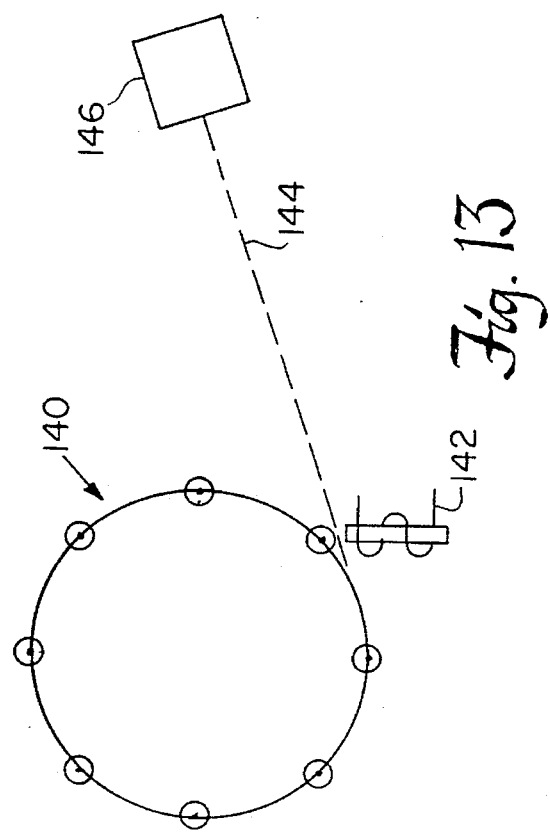
FIG. 13 is a schematic illustration of a system for removing charge from the toroid.

A second method discharges all or parts of the electrons in the toroid by altering the magnetic field. By introducing a magnetic field near the toroid, the magnetic field of the toroid will be overcome at one point. This will cause electrons to shoot out in one beam and hit a target. This is shown schematically in FIG. 13. A typical orbit is shown schematically as 140. A local electromagnet is shown as 142. This electromagnet can be operated to create a local field great enough to overcome the magnetic field of the toroid. When this condition exists, electrons will form a beam tangentially to the orbit as shown by 144. They will collide with the target 146, and in doing so will transfer their energy. The length of duration of the local magnetic field will determine how many electrons are diverted.

Figure 14:
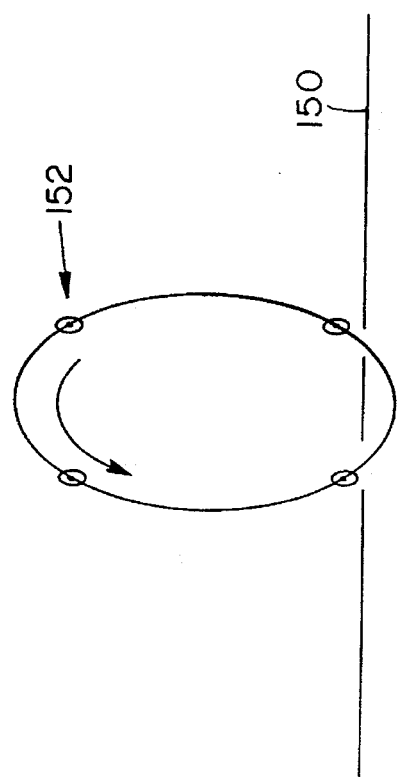
FIG. 14 is a schematic illustration of a system for removing charge by magnetic induction.

A third method disclosed for removing the energy is through magnetic induction. The electrons in the toroid will travel in a fixed orbit. As shown in FIG. 14, placing a magnetic pick up 150 near the orbit will cause an induced voltage in the pickup as the pickup senses electrons passing 152. In this way voltage and current will be produced.

A fourth method disclosed for removing energy is through thermalelectric generation. The toroid location can be altered by external fields. Using external magnetic and electric fields, the toroid can be moved closer to a surface, causing heating of the surface. Existing technology can be used to generate electricity from the heated surface.

Figure 15B:
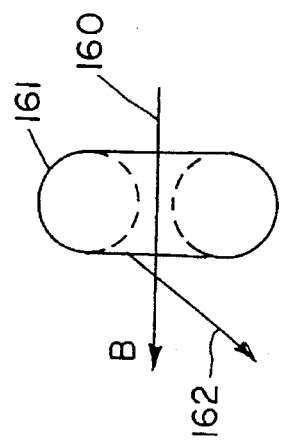
FIGS. 15A and 15B illustrate perspective and side views respectively, for removing energy by magnetic field rotation.
Figure 15A:
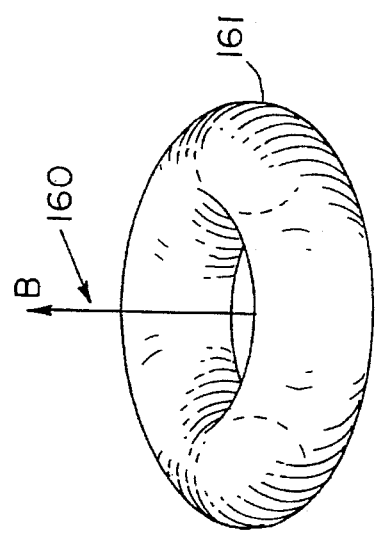

A fifth method for removing energy is through magnetic field rotation. The toroid is a sheet current. The current is also spiraling and will therefore create a magnetic field normal to the toroid as shown by 160 in FIG. 15A. A conductor 162 will cut field lines as shown in FIG. 15B and create induced voltage when the conductor is rotated through the magnetic field, or when the toroid itself is rotated. A sixth method for removing energy is through a reversal of the field on the accelerating plates. As electrons are slowed down, they will create a reactive voltage which can be used as a power source.

Figure 16:
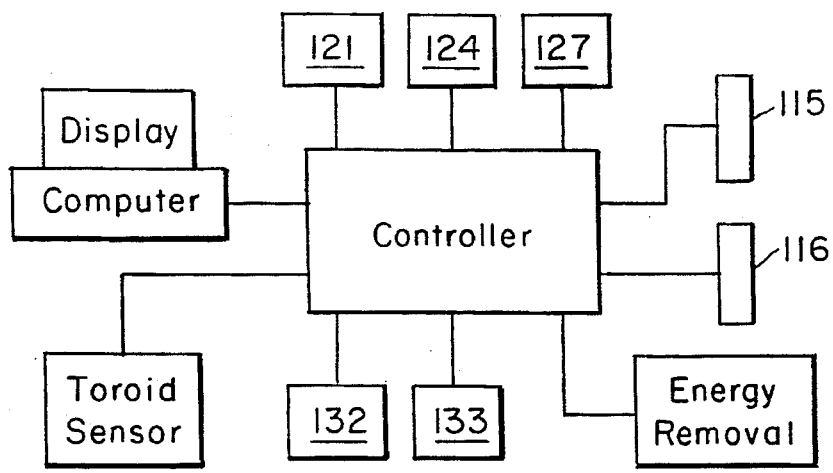
FIG. 16 schematically illustrates a control system to be used with the present energy storage system.

Control of the initiation and maintenance is done as shown in FIG. 16. A controller sets the power supply voltages for the initiation of the toroid. The initiating coil supply, 127, is turned on, then the filament voltage 121, then the grid voltage incrementally to initiate the toroid. When the toroid is ready to self-sustain, the controller turns off these supplies as required. Auxiliary fields 115 and 116 are used as required to establish the magnetic field.

Energy is added using plates 132 and 133. The toroid sensor senses the presence of the particles. This is done with a separate sensing coil. Energy removal circuits are actuated as needed. A display computer provides the operator with instructions, status, and manual control options.

Electrons are sourced in many ways. The electron gun is a well known approach and is shown in FIG. 9. In addition, a multiplicity of guns or sources can be used for the purpose increasing the amount of electrons initially injected to initiate the toroid. This is shown in FIG. 19A. Each gun has the elements and function shown in FIGS. 9 and 10. FIG. 19a shows many guns, 191, each injecting electrons. Initiating coils are not shown for clarity, but would be analogous to FIGS. 9 and 10.

Figure 17A:
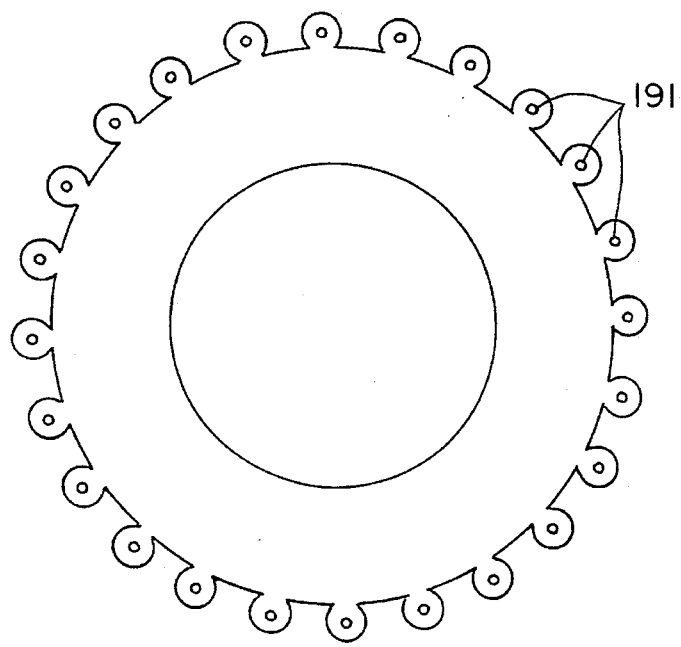
FIG. 17A schematically illustrates a vacuum chamber with a plurality of electron sources arrayed symetrically about the chamber.
Figure 17B:
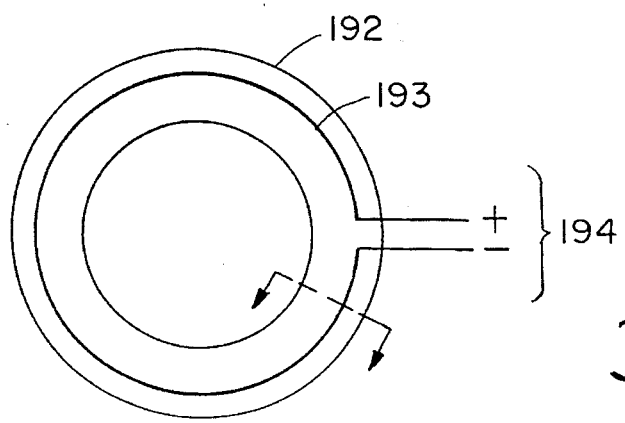
FIGS. 17B and 17C show top cross-sectional and indicated cross sectional views of a filament electron source.
Figure 17C:
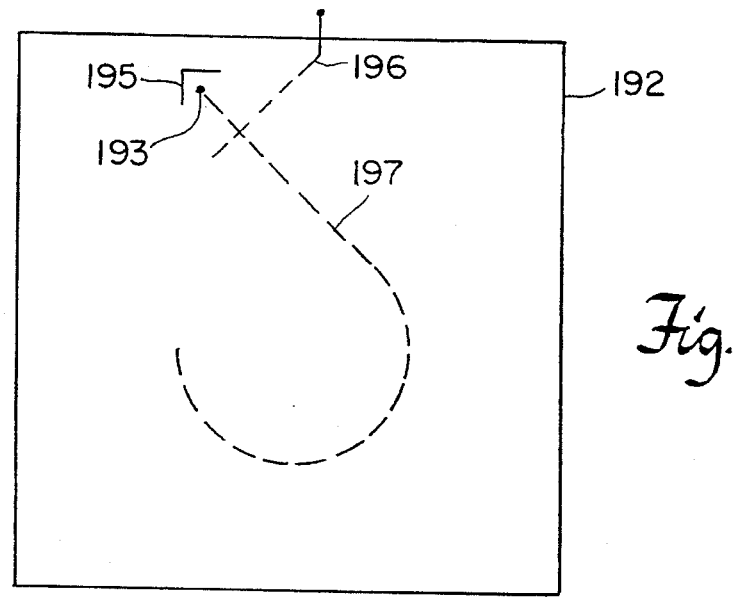

Another source of electrons would be a continuous filament or series of filaments extending completely around the vacuum chamber. FIG. 17A illustrates this with a top view of the vacuum chamber, 192. A continuous filament wire, 193, can also be used and is shown in the top cross-sectional view of FIG. 17B attached to one surface of the chamber, inside the coils. (Initiating coils not shown, for clarity). When power is applied to the filament leads, 194, electrons are generated along the length of the filament. An electron shield, 195, is supplied, as shown in FIG. 17C, which is appropriately biased to direct the electrons toward the grid, 196. The grid will accelerate the electrons which will curve along the path, 197, when the magnetic field is applied as described previously.

Figure 22:
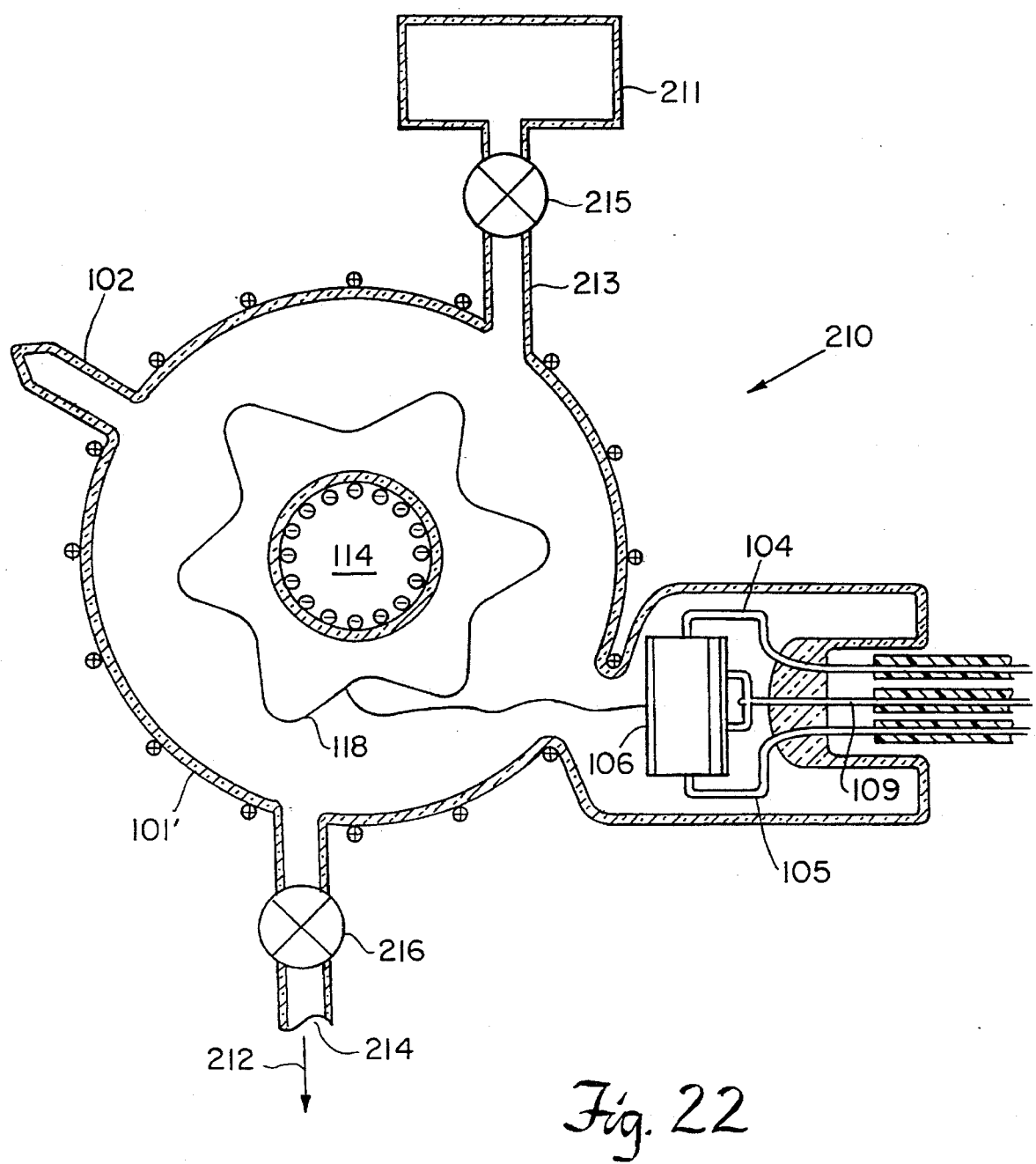
FIG. 22 illustrates a system for removing energy from a vacuum tube system using a gas flow system. This system can be controlled by the energy removal function of the control system shown in FIG. 16.

FIG. 22 shows an arrangement 210 for removing energy by gas heating. A gas supply 211 is attached to the vacuum housing 101' via piping 213 with a valve 215. Opening the valve 215 and controlling the rate of gas flow will inject gas into the housing 101'. The gas will cause elastic collisions with the toroid and gain heat. Hot gas 212 will exit an outlet 214 with a similar valve 216 as the inlet. Normal precautions need be taken to provide for pressure safety relief (not shown here). The electron plasma toroid will lose energy as it repels gases. Gases used would normally be inert.

The preceding description is particular to the preferred embodiments and may be changed or modified without substantially changing the nature of the invention. While the invention has been particularly shown and described with reference to preferred embodiments thereof, it will be understood by those skilled in the art that various changes in form and details may be made therein without departing from the spirit and scope of the invention as defined by the appended claims.

I claim:

1. A charged particle energy storage device comprising:
   a vacuum tube for housing a plurality of electrons circulating within the vacuum tube;
   a magnetic field generator for providing a magnetic field having closed magnetic field lines within the vacuum tube; and
   an electron source for delivering a plurality of electrons into a predetermined path within the vacuum tube, the electrons having a substantially uniform velocity such that the predetermined path comprises a spiral about an axis that is parallel to a closed magnetic field line of the magnetic field;
   a gas source for delivering a plurality of gaseous particles into the vacuum tube such that the gaseous particles interact with the electrons to form energized particles; and
   a valve to control an opening in the vacuum tube such that the energized particles can be removed from the vacuum tube through the opening.

2. The energy storage device of claim 1 wherein the vacuum tube comprises a toroidal-shaped shaped housing.

3. The energy storage device of claim 2 wherein the magnetic field generator comprises a coil wrapped around a toroidally shaped housing.

4. The energy storage device of claim 1 further comprising auxiliary magnets to modify the shape of a path of electrons entering the vacuum tube.

5. The energy storage device of claim 1 wherein the magnetic field generator comprises a conductor.

6. The energy storage device of claim 1 wherein the fixed geometry is a toroid.

7. The energy storage device of claim 1 wherein the magnetic field generator for providing a circular magnetic field is a coiled conductor.

8. The energy storage device of claim 1 further comprising a magnetic induced pick-up outside the vacuum tube to produce electrical energy.

9. A method of generating a fixed geometry of electrons for energy storage comprising the steps of:
   providing a vacuum tube for housing a plurality of electrons;
   forming a magnetic field having closed magnetic field lines within the vacuum tube;
   injecting a plurality of electrons into the magnetic field such that the magnetic field causes the electrons to follow a path that spirals within the vacuum tube about a closed magnetic field line of the magnetic field; and
   removing energy from the vacuum tube.

10. The method of claim 9 wherein the magnetic field is generated by a conductor.

11. The method of claim 9 wherein the magnetic field is generated by a conductor coil.

12. The method of claim 9 wherein the electrons are injected by a filament within the vacuum tube.

13. The method of claim 9 wherein the fixed geometry of electrons is a toroid.

14. The method of claim 9 further comprising flowing a gas through the vacuum tube to remove energy.

15. An energy storage device for providing a fixed geometry of electrons comprising:
- a toroidally shaped vacuum tube for housing a plurality of electrons;
- a magnetic field source positioned about the chamber wherein the plurality of electrons are contained in a spiral path at a substantially uniform velocity within the vacuum tube by a magnetic field provided by the magnetic field source such that the spiral path spirals substantially about magnetic field lines of the magnetic field in the shape of the torrid;
- a gas source for delivering a plurality of gaseous particles into the vacuum tube such that the gaseous particles interact with the electrons to form energized particles; and
- an exit opening in the vacuum tube for the controlled removal of the energized particles.

16. The energy storage device of claim 15 further comprising a magnetic field generated by the circulating electrons within the vacuum tube along a selected pathway.

17. The energy storage device of claim 31 further comprising:
- an inlet valve between the gas source and the vacuum tube to control the delivery of the gaseous particles; and
- an outlet valve to control the removal of the energized particles through the exit opening.

18. The energy storage device of claim 15 further comprising a magnetic energy pick-up to produce electrical energy.

19. The energy storage device of claim 15 further comprising a controller, the controller being electrically connected to an electron source, a sensor, the magnetic field source and an energy removal circuit.

* * * * *